US012337588B2

(12) United States Patent
Hayashi

(10) Patent No.: US 12,337,588 B2
(45) Date of Patent: Jun. 24, 2025

(54) INFORMATION PROCESSING DEVICE, INFORMATION PROCESSING METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Ryotaro Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 209 days.

(21) Appl. No.: 18/145,573

(22) Filed: Dec. 22, 2022

(65) Prior Publication Data

US 2023/0202204 A1 Jun. 29, 2023

(30) Foreign Application Priority Data

Dec. 27, 2021 (JP) ................................ 2021-212435

(51) Int. Cl.
*B41J 11/00* (2006.01)
*B41M 7/00* (2006.01)

(52) U.S. Cl.
CPC .... *B41J 11/00214* (2021.01); *B41J 11/00212* (2021.01)

(58) Field of Classification Search
CPC .................................................. B41J 11/00212
See application file for complete search history.

(56) References Cited

U.S. PATENT DOCUMENTS

2004/0145642 A1* 7/2004 Hoshino ............ B41J 11/00214 347/102
2015/0336410 A1* 11/2015 Weijkamp ........... B41M 5/0047 347/9
2019/0031791 A1* 1/2019 Kanungo ............ C09D 11/101

FOREIGN PATENT DOCUMENTS

JP 2021-030602 A 3/2021

* cited by examiner

*Primary Examiner* — Shelby L Fidler
(74) *Attorney, Agent, or Firm* — WORKMAN NYDEGGER

(57) ABSTRACT

An information processing device controlling a printing device is provided. The printing device includes an ejection unit ejecting a paint that is cured by ultraviolet light, and an irradiation unit irradiating the paint ejected on a print medium with ultraviolet light. The information processing device includes: an acquisition unit acquiring characteristic information of the paint, a print condition in printing by the printing device, and image data representing an image printed by the printing device; and a determination unit determining whether execution of follow-up irradiation, which is additional ultraviolet irradiation, is needed or not, after the printing of the image involving ultraviolet irradiation by the irradiation unit, based on the characteristic information, the print condition, and the image data.

8 Claims, 6 Drawing Sheets

INFORMATION PROCESSING DEVICE, INFORMATION PROCESSING METHOD, AND NON-TRANSITORY COMPUTER-READABLE STORAGE MEDIUM STORING PROGRAM

The present application is based on, and claims priority from JP Application Serial Number 2021-212435, filed Dec. 27, 2021, the disclosure of which is hereby incorporated by reference herein in its entirety.

BACKGROUND

1. Technical Field

The present disclosure relates to an information processing device, an information processing method, and a non-transitory computer-readable storage medium storing a program.

2. Related Art

There is a printing device that prints, using a paint that is cured by ultraviolet irradiation. When printing, such a printing device casts ultraviolet light on an ejected paint and thus cures the ejected paint. JP-A-2021-30602 discloses a configuration for casting ultraviolet light after the ejection of a paint that is cured by ultraviolet irradiation.

In such a printing device, the paint may not be completely cured after printing, depending on the characteristics of a print medium and the paint. In such a case, additional ultraviolet irradiation is carried out. Whether additional ultraviolet irradiation is needed or not is determined by an operator visually checking the result of printing. However, in the determination based on the visual checking by the operator, the accuracy of the determination about whether additional ultraviolet irradiation is needed or not is limited.

SUMMARY

According to an aspect of the present disclosure, an information processing device controlling a printing device is provided. The printing device includes an ejection unit ejecting a paint that is cured by ultraviolet light, and an irradiation unit irradiating the paint ejected on a print medium with ultraviolet light. The information processing device includes: an acquisition unit acquiring characteristic information of the paint, a print condition in printing by the printing device, and image data representing an image printed by the printing device; and a determination unit determining whether execution of follow-up irradiation, which is additional ultraviolet irradiation, is needed or not, after the printing of the image involving ultraviolet irradiation by the irradiation unit, based on the characteristic information, the print condition, and the image data.

BRIEF DESCRIPTION OF THE DRAWINGS

FIG. 1 shows an example of the configuration of an image processing device or the like.

DESCRIPTION OF EXEMPLARY EMBODIMENTS

An embodiment of the present disclosure will now be described in the following order:

(1) Configuration of Information Processing Device (2) Print Control Processing (3) Other Embodiments.

(1) Configuration of Information Processing Device

Figure 1:
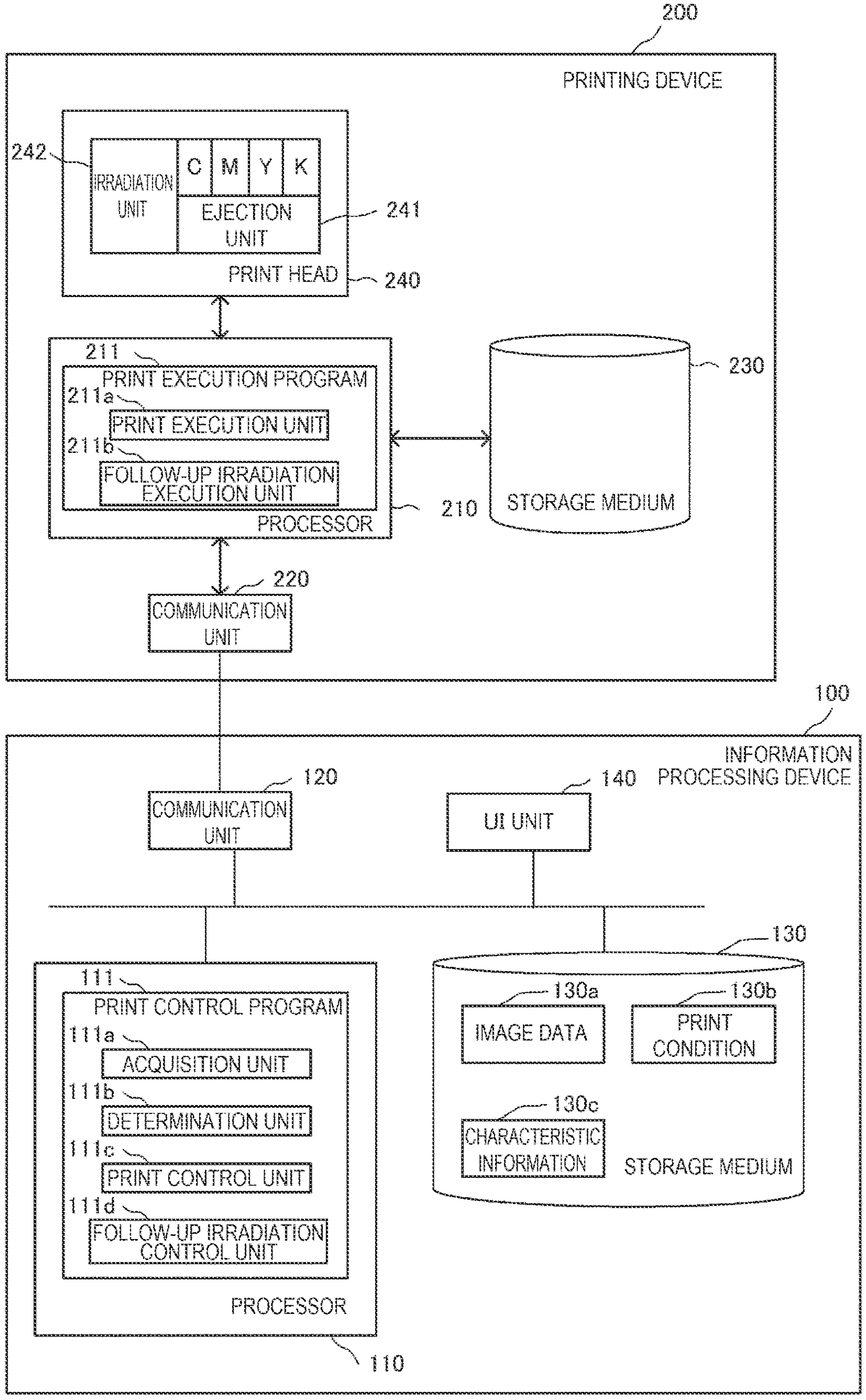

FIG. 1 shows an example of the configuration of an information processing device 100 and a printing device 200 according to this embodiment. The information processing device 100 in this embodiment is an information processing device controlling the printing device 200 and is, for example, a personal computer, a tablet device, a smartphone, or the like. The printing device 200 is a printing device printing an image on a print medium (for example, an acrylic plate, a glass plate, a medium made of a resin (for example, a smartphone case or the like made of a resin), a print paper, or the like) in response to an instruction from the information processing device 100. In this embodiment, the printing device 200 ejects a predetermined paint on the print medium and thus prints on the print medium. In this embodiment, the predetermined paint is cyan (C), magenta (M), yellow (Y), and black (K) coloring materials (for example, dyes, pigments, or the like). The printing device 200 may also use other paints for printing, such as a white coloring material and a paint to achieve a surface effect (for example, clear ink, varnish or the like). In the description below, C-color, M-color, Y-color, and K-color coloring materials used by the printing device 200 are referred to as a C coloring material, an M coloring material, a Y coloring material, and a K coloring material, respectively. The paints used by the printing device 200 in this embodiment are paints cured by ultraviolet irradiation. In this embodiment, the printing device 200 ejects a paint on the print medium and irradiates the ejected paint with ultraviolet light, and thus performs printing. The information processing device 100 and the printing device 200 are coupled in such a way as to be able to communicate with each other via a wire or wirelessly.

The hardware included in the information processing device 100 and the printing device 200 will now be described.

The information processing device 100 has a processor 110, a communication unit 120, a storage medium 130, and a UI unit 140. The information processing device 100 also has a random-access memory (RAM) and a read-only memory (ROM), not illustrated. The processor 110 executes various programs stored in the ROM, the storage medium 130, and the like, and thus controls the information processing device 100. The processor 110 may be formed of a single chip or a plurality of chips. In this embodiment, the processor 110 is a central processing unit (CPU). However, the processor 110 may be formed of an ASIC or the like, or may be formed of a CPU and an ASIC. The communication unit 120 has a circuit used for communication conforming to various wired or wireless communication protocols with an external device such as the printing device 200. The storage medium 130 stores various programs such as a print control program 111 for executing processing of controlling the printing via the printing device 200, and various kinds of information such as image data 130*a*, a print condition 130*b*, and characteristic information 130*c*.

The image data 130*a* is data of a print target image. In the description below, the print target image represented by the image data 130*a* is referred to as a print image. In this embodiment, the image data 130*a* is RGB data that expresses each pixel in the print image divided by a predetermined number of pixels (for example, 640×480, 1200×1600, or the like), in the form of a gradation value in 3 channels of RGB.

The print condition 130*b* represents various conditions for the printing of the image data 130*a* (for example, a print area in the print medium, and the like). In this embodiment, the print condition 130*b* represents at least the number of print paths in printing the print image, and the image resolution in printing the print image. The print path is the printing of one line performed by a print head 240 of the printing device 200, described later, while moving from one end to the other end of the print area in a main scanning direction on the print medium. The main scanning direction will now be described. The printing device 200 repeats printing on a per line basis on the print medium via the print head 240 and thus performs printing. The direction of the line is the main scanning direction. Also, in the description below, a direction perpendicular to the main scanning direction and parallel to the print medium arranged at the time of printing is referred to as a sub scanning direction. The number of print paths is the number of times a print path is made that is required for printing in the same area in the print area. For example, when the number of print paths is three, the print head 240 scans each pixel in the image to be printed, three times. In this embodiment, the number of print paths in printing the print image is defined as n. The image resolution is an indicator indicating the density of the paint applied to the print medium (pixel density) and is expressed, for example, by the unit of dots per inch (dpi). When the number of print paths and the image resolution at the time of printing are associated with each other, the print condition 130*b* may represent one of the number of print paths in printing the print image and the image resolution in printing the print image. Thus, the processor 110 can specify the number of print paths and the image resolution in printing the print image, from the print condition 130*b*.

In this embodiment, the processor 110 decides the number of print paths and the image resolution in printing the print image, based on a designated value designated by a user about the image quality of the print image to be formed on the print medium. In this embodiment, the value of image quality (for example, normal image quality, high image quality, and the like), the number of print paths and the image resolution, are associated with each other in advance. The processor 110 decides the number of print paths and the image resolution associated with the designated value of image quality that is designated, as the number of print paths and the image resolution in printing the print image. When the number of print paths and the image resolution in printing are associated with each other, the processor 110 may decide one of the number of print paths and the image resolution, based on the designated value of image quality. Thus, the processor 110 can decide the print condition for achieving the designated image quality. In this embodiment, the print condition 130*b* is decided in advance by the processor 110, based on information inputted by the user via the UI unit 140, described later. However, the print condition 130*b* may be a predetermined print condition.

The characteristic information 130*c* is information representing a characteristic of predetermined various paints. In this embodiment, this characteristic is a characteristic representing the curability of the paint by ultraviolet irradiation. In this embodiment, the characteristic information 130*c* is information representing what level of energy needs to be cast by ultraviolet irradiation in order to cure various paints per predetermined unit amount (for example, a weight such as 1 g, 1 mg or 1 μg, a volume such as 1 l, 1 ml, 1 μl or 1 ρl, or the like). In the description below, the energy cast on an irradiation target by ultraviolet irradiation is referred to as irradiation energy. In the description below, the irradiation energy required for curing a paint is referred to as curing energy. The characteristic information 130*c* in this embodiment is information representing the curing energy per unit amount with respect to various paints. In the description below, the curing energy for a paint in a unit amount is referred to as unit curing energy for the paint. In this embodiment, the characteristic information 130*c* is correspondence information between the serial number of each of various paints and the unit curing energy. However, when only one type of coloring material is used from among coloring materials of the same color, the characteristic information 130*c* about coloring materials may be correspondence information between the color of each of various coloring materials and the unit curing energy. The characteristic information 130*c* is found, for example, by casting various kinds of irradiation energy on each of various paints in a unit amount and then measuring whether the paint is cured or not, in advance.

The UI unit 140 has an input unit accepting an input from the user, such as a mouse, a keyboard, a touch pad, or an operation unit on a touch panel, and an output unit used to present information to the user, such as a monitor, a display unit on a touch panel, or a speaker.

The printing device 200 has a processor 210, a communication unit 220, a storage medium 230, and the print head 240. The printing device 200 also has a RAM and a ROM, not illustrated. The processor 210 executes various programs stored in the ROM, the storage medium 230, and the like, and thus controls the printing device 200. The processor 210 may be formed of a single chip or a plurality of chips. In this embodiment, the processor 210 is a CPU. However, the processor 210 may be formed of an ASIC or the like, or may be formed of a CPU and an ASIC. The communication unit 220 has a circuit used for communication conforming to various wired or wireless communication protocols with an external device such as the information processing device 100. The storage medium 230 stores various programs such as a print execution program 211 for controlling the execution of printing, and various kinds of information.

The print head 240 ejects the paint to the print medium and casts ultraviolet light thereon. The processor 210 causes the print head 240 to eject the paint to the print medium and cast ultraviolet light thereon, while moving the print head 240 via a drive mechanism of the print head 240. The processor 210 repeats printing on a per line basis in the main scanning direction on the print medium via the print head 240 and thus performs printing.

The print head 240 has an ejection unit 241 used to eject various paints, and an irradiation unit 242 casting ultraviolet light on the paint ejected by the ejection unit 241. In this embodiment, the ejection unit 241 is a nozzle used to eject various paints used by the printing device 200 (in this embodiment, each of the CMYK coloring materials). The ejection unit 241 ejects the various coloring materials to the print medium and thus applies the various coloring materials to the print medium. The irradiation unit 242 is a lamp casting ultraviolet light and arranged at both ends in the main scanning direction of the ejection unit 241. In this embodiment, the irradiation intensity of the irradiation unit 242 is constant. When the print head 240 moves for scanning, the processor 210 causes the irradiation unit 242 located at a rear part in the scanning direction of the print head 240 to cast ultraviolet light onto the paint ejected to the print medium by the ejection unit 241. In this embodiment, when the print head 240 moves for scanning for one print path, the irradiation unit 242 casts ultraviolet light with a predetermined intensity per predetermined unit area for a predetermined period corresponding to the scanning speed, onto a scanning target area. Therefore, the scanning target area is irradiated with predetermined irradiation energy per unit area by the irradiation unit 242. In the description below, the irradiation energy cast onto an area of a unit area by the irradiation unit 242 in the scanning of one print path is referred to as unit irradiation energy.

The functions of the information processing device 100 and the printing device 200 will now be described.

The processor 110 of the information processing device 100 executes the print control program 111 stored in the storage medium 130 and thus functions as an acquisition unit 111*a*, a determination unit 111*b*, a print control unit 111*c*, and a follow-up irradiation control unit 111*d*.

The acquisition unit 111*a* is a function of acquiring the characteristic information 130*c*, the print condition 130*b*, and the image data 130*a*. By the function of the acquisition unit 111*a*, the processor 110 acquires the characteristic information 130*c*, the print condition 130*b*, and the image data 130*a* from the storage medium 130.

The determination unit 111*b* is a function of determining whether follow-up irradiation, which is additional irradiation by the irradiation unit 242, needs to be executed or not, after the printing of the image data 130*a* involving ultraviolet irradiation by the irradiation unit 242, based on the characteristic information 130*c*, the print condition 130*b*, and the image data 130*a* acquired by the function of the acquisition unit 111*a*. The determination unit 111*b* in this embodiment is also a function of deciding the irradiation energy cast on the paint ejected on the print medium by follow-up irradiation additionally executed when it is determined that follow-up irradiation needs to be executed, based on the characteristic information 130*c*, the print condition 130*b*, and the image data 130*a*.

By the function of the determination unit 111*b*, the processor 110 acquires the unit curing energy for the various paints used by the printing device 200, based on the characteristic information 130*c*. In this embodiment, since the characteristic information 130*c* represents the unit curing energy for the various paints, the processor 110 reads the characteristic information 130*c* and thus acquires the unit curing energy for the various paints.

The processor 110 generates print data of the print image, based on the image data 130*a* and the print condition 130*b*. The print data is data representing as aspect of the printing to be executed by the printing device 200. In this embodiment, the print data represents the print area in the print medium, the image resolution, the number of print paths, the amount of paint applied to each pixel, or the like. More specifically, the processor 110 enlarges or reduces RGB data of the print image represented by the image data 130*a*, based on the image resolution represented by the print condition 130*b*. The processor 110 then converts the enlarged or reduced RGB data into gradation data for each color (in this embodiment C, M, Y, K) of the predetermined paints (coloring materials) used in the printing device 200. The processor 110 then performs halftone processing, based on the converted gradation data, and decides which paint to eject in what amount to each pixel in the print area in order to achieve the color of the print image. The processor 110 acquires data representing which paint to eject in what amount to which pixel in the print medium, thus decided, as the print data of the print image.

Figure 2:
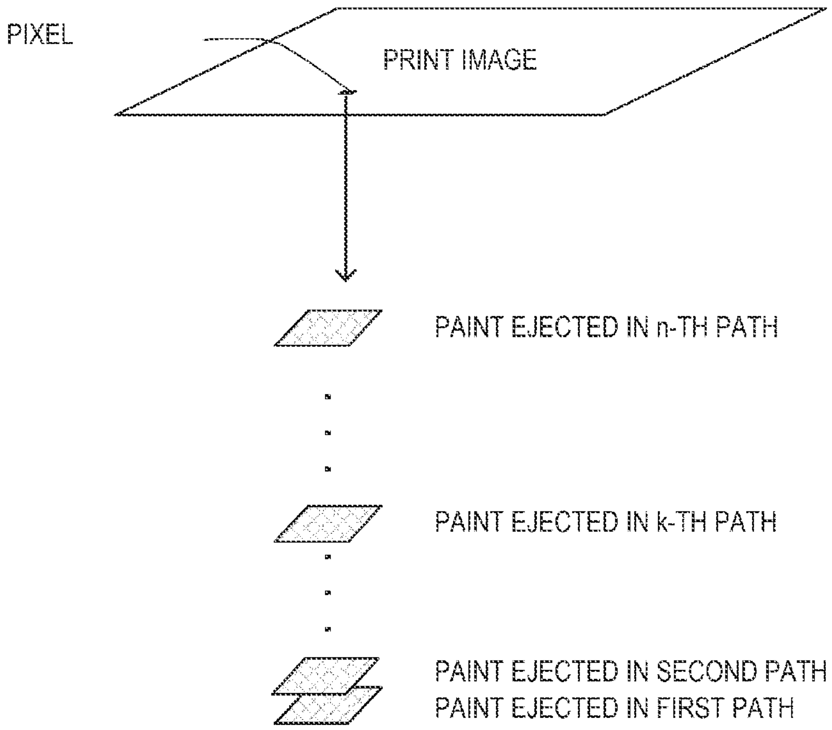
FIG. 2 explains a paint ejected to each pixel.

The ejection of the paint to each pixel when the print image is printed in the print area on the print medium will now be described, referring to FIG. 2. In this embodiment, the number of print paths in printing the print image is n. Therefore, each pixel is scanned n times by the print head 240. In the description below, a k-th scan by the print head 240, where k is an integer equal to or greater than 1 and equal to or smaller than n, is referred to as a k-th path scan. In each scan, the print head 240 ejects the paint to each pixel that is a paint ejection target, and subsequently casts ultraviolet light on each pixel with the paint ejected thereto. The print head 240 does not eject the paint to each pixel that is not a paint ejection target, and casts ultraviolet light thereon. Therefore, the paint ejected in each of the first to n-th path scans is prescribed for each pixel in the print area, as shown in FIG. 2. When a paint is not ejected in the k-th path scan, there is no paint ejected in the k-th path. In the description below, the paint ejected in the k-th path scan is referred to as a paint ejected in the k-th path.

Figure 3:
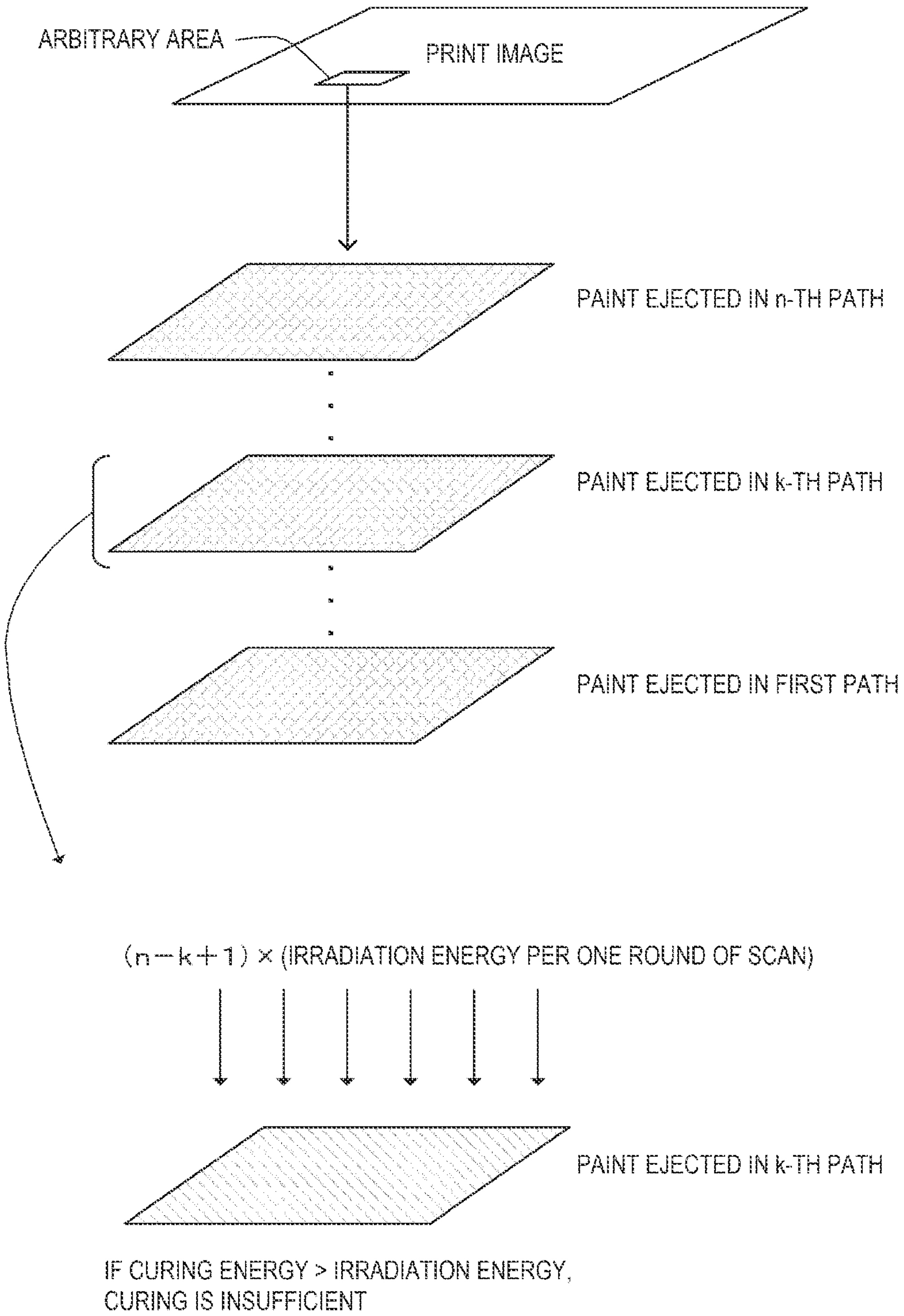
FIG. 3 explains curing energy in a selected area.

As shown in FIG. 3, the paint ejected in the first path to the paint ejected in the n-th path are prescribed also for an arbitrary area in the print area. The paint ejected in the k-th path for a certain area in the print area is the total of the paints ejected in the k-th path for all the pixels included in this area. The paint ejected in the k-th path is irradiated with ultraviolet light cast by the irradiation unit 242 in the k-th path scan and is also irradiated by ultraviolet light cast by the irradiation unit 242 in the (k+1)th to n-th path scans. In one round of scan by the print head 240, this area is irradiated with the irradiation energy of (unit irradiation energy×(area of this area/unit area)). Therefore, when the print head 240 performs scanning corresponding to the number of print paths n, the paint ejected in the k-th path in this area is irradiated with the irradiation energy of (unit irradiation energy×(area of this area/unit area))×(n−k+1). When the curing energy for the paint ejected in the k-th path in this area is higher than this irradiation energy, the curing of the paint ejected in the k-th path in this area is insufficient.

Therefore, in this embodiment, the processor 110 selects an area from the print area and compares the curing energy with the irradiation energy that is cast with respect of each of the paints ejected in the first to n-th paths in the selected area, and thus determines whether additional ultraviolet irradiation is needed or not after the completion of the printing. Details of this processing will now be described.

The processor 110 selects an area of a predetermined size from the print area where the print image is printed. In this embodiment, the predetermined size is the size of one pixel. That is, the processor 110 selects an area of one pixel from among a plurality of pixels included in the print image printed in the print area. In the description below, the area selected at this point is referred to as a selected area.

The processor 110 specifies the type and the amount of each of the paints ejected in the first to n-th paths that are ejected in the selected area, based on the print data of the print image. The processor 110 derives the curing energy for each of the paints ejected in the first to n-th paths, based on the specified type and amount of the paint, and the unit curing energy for the various paints acquired based on the characteristic information 130*c*.

More specifically, the processor 110 derives the curing energy for the paint ejected in the k-th path in the selected area, in the following manner. The processor 110 specifies the type and the amount of the paint ejected in the k-th path in the selected area, based on the print data of the print image. The processor 110 derives the curing energy for each type of paint included in the paint ejected in the k-th path in the selected area, based on the unit curing energy for the various paints acquired based on the characteristic information 130*c* and the amount of each type of paint included in the paint ejected in the k-th path in the selected area. The processor 110 then derives the total of the derived curing energy, as the curing energy for the paint ejected in the k-th path in the selected area.

For example, it is assumed that the type and the amount of the paint ejected in the k-th path in the selected area are the C coloring material and 10 pl, the M coloring material and 5 pl, and the Y coloring material and 20 pl. In this case, the processor 110 acquires the unit curing energy for each of the C coloring material, the M coloring material, and the Y coloring material from the characteristic information 130*c*. The processor 110 then derives the curing energy for 10 pl of the C coloring material ejected in the k-th path in the selected area by calculating (unit irradiation energy for the C coloring material×(10 pl/unit amount)). The processor 110 derives the curing energy for 5 pl of the M coloring material ejected in the k-th path in the selected area by calculating (unit irradiation energy for the M coloring material×(5 pl/unit amount)). The processor 110 derives the curing energy for 20 pl of the Y coloring material ejected in the k-th path in the selected area by calculating (unit irradiation energy for the Y coloring material×(20 pl/unit amount)). The processor 110 then derives the total of the curing energy derived for each coloring material, as the curing energy for the paint ejected in the k-th path in the selected area.

The processor 110 also derives the irradiation energy cast on the paint ejected in the k-th path in the selected area, in the following manner. The irradiation energy cast on the selected area by the irradiation unit 242 in the scanning by the print head 240 for one print path is (unit irradiation energy×(area of selected area/unit area)). The paint ejected in the k-th path in the selected area is irradiated (n−k+1) times by the irradiation unit 242. Therefore, the processor 110 derives the irradiation energy cast on the paint ejected in the k-th path in the selected area by calculating (n−k+1)×(unit irradiation energy×(area of selected area/unit area)).

The processor 110 compares the curing energy for the paint ejected in the k-th path in the selected area with the irradiation energy cast on the paint ejected in the k-th path in the selected area. When the curing energy is higher than the irradiation energy, the processor 110 determines that follow-up irradiation is needed because the curing of the paint ejected in the k-th path in the selected area is insufficient even after the completion of the printing.

The processor 110 newly selects an unselected area from the print area, as a selected area, and performs similar processing on the selected area thus selected. The selected area that is newly selected may be an area partly overlapping the already selected area or may be an area that does not overlap the already selected area. The processor 110 performs the above processing until selecting all the areas from the print area as a selected area, and thus determines whether follow-up irradiation is needed or not, for the curing of the print image.

The processor 110 finds the difference between the curing energy and the irradiation energy that is cast, for each of the paints ejected in the first to n-th paths in each selected area. When the processor 110 has determined that follow-up irradiation is needed, the processor 110 derives the irradiation energy cast on the print image in the follow-up irradiation, based on the resulting difference. More specifically, the processor 110 derives the difference value between the curing energy and the irradiation energy that is cast, for each of the paint ejected in the first path to the paint ejected in the n-th path in each selected area. The processor 110 then specifies the largest difference value of the derived difference values. The processor 110 then decides the irradiation energy cast per unit area in the follow-up irradiation on the print image by calculating (specified difference value×(unit area/area of selected area)). In the description below, the irradiation energy per unit area that is specified at this point is referred to as follow-up irradiation energy. The curing energy for the paints ejected in the first to n-th paths in each selected area is decided, based on the print data of the print image generated based on the image data 130*a* and the print condition 130*b*, and the characteristic information 130*c*. The irradiation energy cast on the paints ejected in the first to n-th paths in each selected area is decided, based on the number of print paths n, which is decided, based on the print condition 130*b*. Therefore, the processor 110 derives the follow-up irradiation energy, based on the image data 130*a*, the print condition 130*b*, and the characteristic information 130*c*. Thus, the processor 110 can derive the follow-up irradiation energy that can sufficiently cure the insufficiently cured part of the print image. The processor 110 instructs the printing device 200 to cast the derived follow-up irradiation energy per unit area of the printed print image and thus can achieve sufficient curing of the print image.

The print control unit 111*c* is a function of instructing the printing device 200 to print the print image and thus controlling the printing of the print image. By the function of the print control unit 111*c*, the processor 110 transmits the print data of the print image to the printing device 200 and instructs the printing device 200 to print the print image on the print medium, via the communication unit 120.

The follow-up irradiation control unit 111*d* is a function of instructing the printing device 200 to execute follow-up irradiation and thus controlling follow-up irradiation on the printed print image. By the function of the follow-up irradiation control unit 111*d*, the processor 110 decides at least one of the irradiation intensity and the irradiation time of the irradiation via the irradiation unit 242 in follow-up irradiation, as the aspect of irradiation in follow-up irradiation to implement the irradiation of the follow-up irradiation energy in follow-up irradiation. Thus, the processor 110 can decide the aspect of irradiation that can achieve the follow-up irradiation energy. In this embodiment, the irradiation intensity of the irradiation unit 242 is constant. Therefore, the processor 110 decides the irradiation time of the irradiation via the irradiation unit 242 in follow-up irradiation. Details of this processing will now be described.

In this embodiment, follow-up irradiation is performed in the following manner. That is, the print head 240 repeats ultraviolet irradiation on a scanned area during a scan from one end to the other end in the main scanning direction, while changing the position of the sub scanning direction, and thus uniformly casts ultraviolet light on the entirety of the print image. At this point, the ultraviolet irradiation on one line performed by the print head 240 in follow-up irradiation while moving from one end to the other end of the print area in the main scanning direction on the print medium is referred to as an irradiation path. The number of times ultraviolet irradiation is performed in the same area in the printed print image in follow-up irradiation is referred to as the number of irradiation paths. That is, the number of irradiation paths represents the number of times the print head 240 scans the same area in the printed print image in follow-up irradiation. In this embodiment, in one irradiation path, unit irradiation energy similar to that in the case of a print path is cast per unit area.

In this embodiment, the processor 110 decides the number of irradiation paths in follow-up irradiation and thus decides the irradiation time of ultraviolet light by the irradiation unit 242. More specifically, the processor 110 derives the value of the derived follow-up irradiation energy divided by the unit irradiation energy. The processor 110 then derives the value acquired by rounding up the numbers after the decimal point of the derived value, as the number of irradiation paths. That is, the processor 110 decides the aspect of irradiation in follow-up irradiation, in the form of an aspect in which ultraviolet light is uniformly cast on the entirety of the printed print image in the derived number of irradiation paths. Thus, the processor 110 can decide the number of irradiation paths that can implement the follow-up irradiation with the follow-up irradiation energy.

The processor 110 then instructs the printing device 200 to execute the follow-up irradiation in the decided aspect of irradiation, via the communication unit 120. That is, the processor 110 gives an instruction to uniformly cast ultraviolet light on the entirety of the printed print image in the derived number of irradiation paths.

The functions of the printing device 200 will now be described.

The processor 210 of the printing device 200 executes the print execution program 211 stored in the storage medium 230 and thus functions as a print execution unit 211*a* and a follow-up irradiation execution unit 211*b*.

The print execution unit 211*a* is a function of executing the printing of the print image via the print head 240 in response to an instruction from the information processing device 100. By the function of the print execution unit 211*a*, the processor 210 executes the printing of the print image on the print medium via the print head 240, based on the print data received with the print instruction from the information processing device 100.

The follow-up irradiation execution unit 211*b* is a function of executing follow-up irradiation on the print image printed by the function of the print execution unit 211*a*, via the irradiation unit 242, in response to an instruction from the information processing device 100. By the function of the follow-up irradiation execution unit 211*b*, the processor 210 executes follow-up irradiation on the print image printed on the print medium in the aspect of irradiation designated by the information processing device 100, via the irradiation unit 242. In this embodiment, the processor 210 executes ultraviolet irradiation in the number of irradiation paths notified of by the information processing device 100, as the follow-up irradiation.

With the configuration according to this embodiment, the information processing device 100 determines whether the execution of follow-up irradiation is needed or not after the printing of the print image in the number of print paths n, based on the characteristic information 130*c*, the print condition 130*b*, and the image data 130*a*. More specifically, the information processing device 100 derives the curing energy for a paint ejected in an area in the printed image and the irradiation energy cast on this paint. When the derived curing energy is higher than the derived irradiation energy, the information processing device 100 determines that follow-up irradiation is needed because the curing of this paint is insufficient. Thus, the information processing device 100 can more accurately determine whether follow-up irradiation is needed or not, than when whether follow-up irradiation is needed or not is determined based on the visual checking by the operator.

(2) Print Control Processing

Print control processing executed by the information processing device 100 will now be described, using FIGS. 4 and 5.

Figure 4:
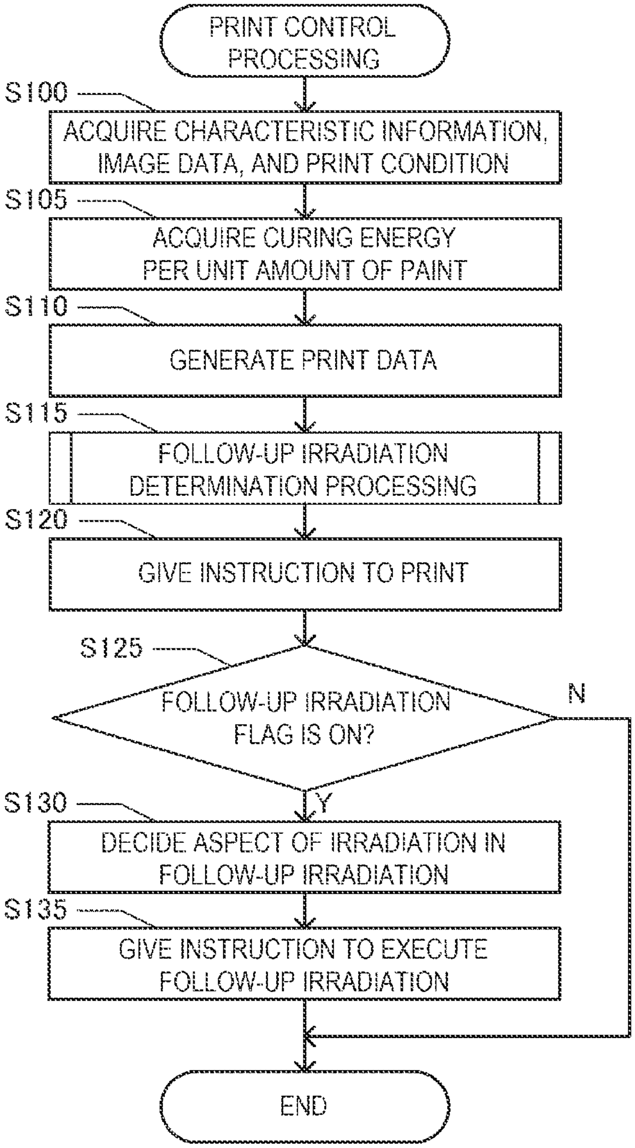
FIG. 4 is a flowchart showing an example of print control processing.

The processor 110 of the information processing device 100 starts the processing shown in FIG. 4 at a timing when an instruction to start the print control processing is given.

In step S100, by the function of the acquisition unit 111*a*, the processor 110 acquires the image data 130*a*, the print condition 130*b*, and the characteristic information 130*c* from the storage medium 130. The processing of step S100 is an example of an acquisition step. After completing the processing of step S100, the processor 110 advances the processing to step S105.

In step S105, by the function of the determination unit 111*b*, the processor 110 acquires the unit curing energy of the various paints used by the printing device 200, from the characteristic information 130*c*. After completing the processing of step S105, the processor 110 advances the processing to step S110.

In step S110, by the function of the determination unit 111*b*, the processor 110 generates print data of the print image, based on the image data 130*a* and the print condition 130*b*. After completing the processing of step S110, the processor 110 advances the processing to step S115.

In step S115, by the function of determination unit 111*b*, the processor 110 executes follow-up irradiation determination processing of determining whether follow-up irradiation is needed or not after the printing of the print image. The processing of step S115 is an example of a determination step.

Details of the follow-up irradiation determination processing of step S115 will now be described, referring to FIG. 5.

In step S200, by the function of the determination unit 111*b*, the processor 110 generates a follow-up irradiation flag, which is flag information representing whether follow-up irradiation is needed or not, an index k indicating what ordinal number the loop processing to be executed is, and an energy variable storing the value of energy cast on an area of the same size as the selected area in follow-up irradiation, and stores these in the RAM. The processor 110 sets the initial values of the follow-up irradiation flag, the index k, and the energy variable to off, 1, and 0, respectively. After completing the processing of step S200, the processor 110 advances the processing to step S205.

In step S205, by the function of the determination unit 111*b*, the processor 110 selects an unselected area of a predetermined size, as a selected area, from the print area where the print image is printed. The area selected as the selected area may be an area partly overlapping the already selected area or may be an area that does not overlap the already selected area at all.

In step S210, by the function of the determination unit 111*b*, the processor 110 acquires the type and the amount of the paint included in the paint ejected in the k-th path, k being the index k, in the selected area selected in the immediately preceding step S205, based on the print data generated in step S110. The processor 110 then derives the curing energy for the paint ejected in the k-th path in the selected area selected in the immediately preceding step S205, based on the unit curing energy of the various paints acquired in step S105, and the acquired type and amount of the paint. After completing the processing of step S210, the processor 110 advances the processing to step S215.

In step S215, by the function of the determination unit 111*b*, the processor 110 derives the irradiation energy cast on the paint ejected in the k-th path in the selected area selected in the immediately preceding step S205, by calculating (n−k+1)×(unit irradiation energy×(area of selected area/unit area)). The processor 110 then determines whether the curing energy derived in the immediately preceding step S210 is higher than the derived irradiation energy or not. When the processor 110 has determined that the curing energy derived in the immediately preceding step S210 is higher than the derived irradiation energy, the processor 110 determines that follow-up irradiation is needed, and advances the processing to step S220. Meanwhile, when the processor 110 has determined that the curing energy derived in the immediately preceding step S210 is equal to or lower than the derived irradiation energy, the processor 110 advances the processing to step S235.

In step S220, by the function of the determination unit 111*b*, the processor 110 turns on the follow-up irradiation flag. After completing the processing of step S220, the processor 110 advances the processing to step S225.

In step S225, by the function of the determination unit 111*b*, the processor 110 derives a difference value by subtracting the irradiation energy ((n−k+1)×(unit irradiation energy×(area of selected area/unit area))) cast on the paint ejected in the k-th path, from the curing energy for the paint ejected in the k-th path in the selected area selected in the immediately preceding step S205. The processor 110 then determines whether the derived difference value is greater than the value of the energy variable or not. When the processor 110 has determined that the derived difference value is greater than the value of the energy variable, the processor 110 advances the processing to step S230. Meanwhile, when the processor 110 has determined that the derived difference value is equal to or smaller than the value of the energy variable, the processor 110 advances the processing to step S235.

In step S230, by the function of the determination unit 111*b*, the processor 110 updates the value of the energy variable with the difference value derived in the immediately preceding step S225. After completing the processing of step S230, the processor 110 advances the processing to step S235.

In step S235, by the function of the determination unit 111*b*, the processor 110 determines whether the value of the index k is smaller than the number of print paths n or not. When the processor 110 has determined that the value of the index k is smaller than the number of print paths n, the processor 110 advances the processing to step S240. Meanwhile, when the processor 110 has determined that the value of the index k is equal to or greater than the number of print paths n, the processor 110 advances the processing to step S245.

In step S240, by the function of the determination unit 111*b*, the processor 110 increases the value of the index k by 1. After completing the processing of step S240, the processor 110 advances the processing to step S210.

In step S245, by the function of the determination unit 111*b*, the processor 110 initializes the value of the index k to 1. After completing the processing of step S245, the processor 110 advances the processing to step S250.

In step S250, by the function of the determination unit 111*b*, the processor 110 determines whether all the areas that are selectable as a selected area are selected as a selected area from the print area where the print image is printed, or not. When the processor 110 has determined that all the areas that are selectable as a selected area are selected as a selected area from the print area where the print image is printed, the processor 110 completes the processing shown in FIG. 5 and advances the processing to step S120 shown in FIG. 4. Meanwhile, when the processor 110 has determined that there still is an area that is not selected as a selected area from the print area where the print image is printed, the processor 110 advances the processing to step S205.

Figure 5:
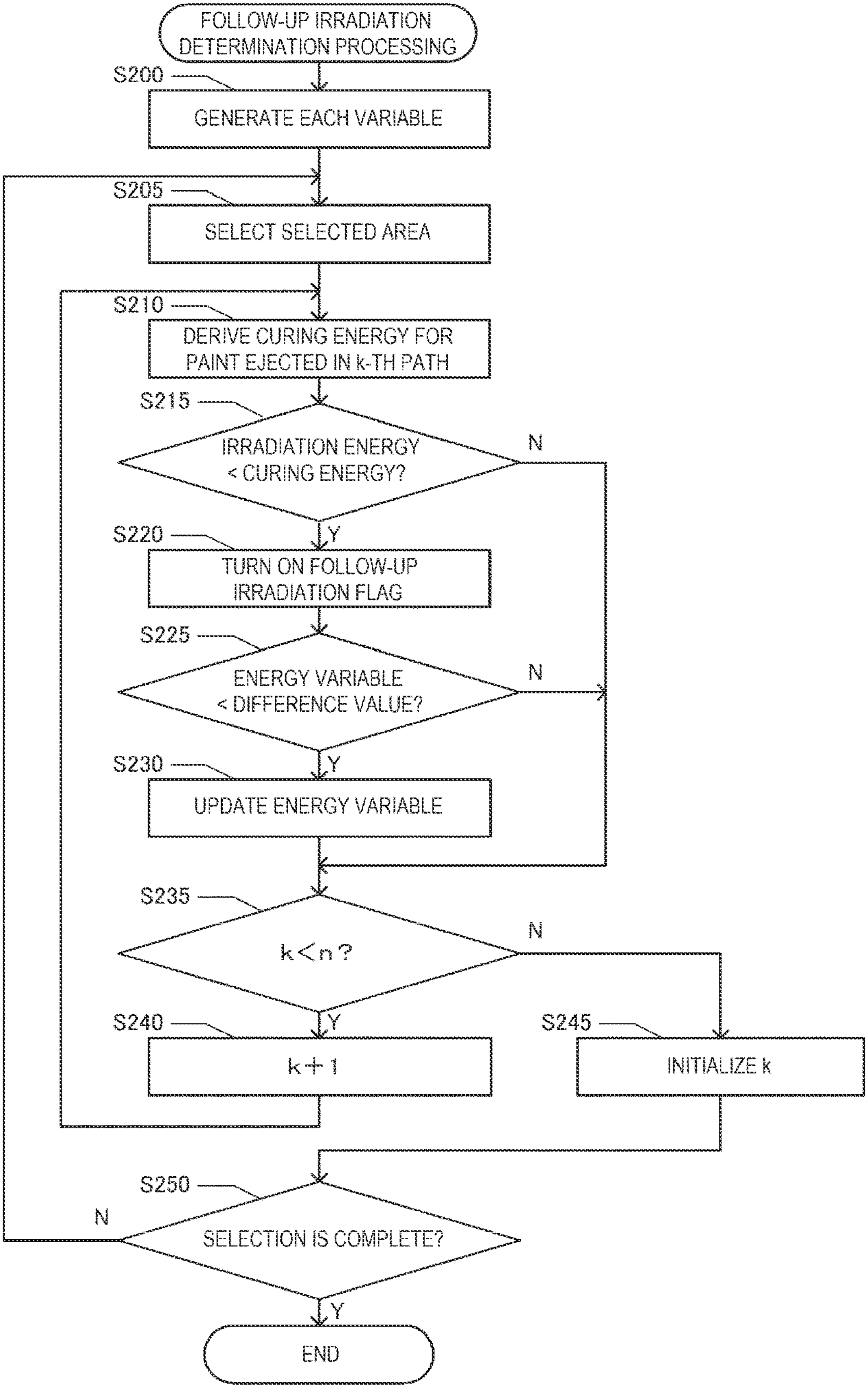
FIG. 5 is a flowchart showing an example of follow-up irradiation determination processing.

By the above processing in FIG. 5, the processor 110 determines whether follow-up irradiation is needed or not, and stores the result of the determination in the follow-up irradiation flag. The processor 110 also derives energy that needs to be cast on an area of the same size as the selected area in follow-up irradiation and stores the derived energy in the energy variable.

Referring back to FIG. 4, the description continues.

In step S120, by the function of the print control unit 111*c*, the processor 110 transmits the print data generated in step S110 to the printing device 200 and instructs the printing device 200 to print the print image, via the communication unit 120. After completing the processing of step S120, the processor 110 advances the processing to step S125.

In step S125, by the function of the determination unit 111*b*, the processor 110 determines whether the follow-up irradiation flag is on or not, and thus determines whether follow-up irradiation is needed or not. When the processor 110 has determined that the follow-up irradiation flag is on, the processor 110 determines that follow-up irradiation is needed, and advances the processing to step S130. When the processor 110 has determined that the follow-up irradiation flag is not on, the processor 110 determines that follow-up irradiation is not needed, and completes the processing shown in FIG. 4.

In step S130, by the function of the follow-up irradiation control unit 111*d*, the processor 110 derives follow-up irradiation energy, which is the energy cast per unit area in follow-up irradiation, by calculating (value of energy variable×(unit area/area of selected area)). The processor 110 then derives the value of the derived follow-up irradiation energy divided by the unit irradiation energy with the numbers after the decimal point rounded up, as the number of irradiation paths in follow-up irradiation. As the aspect of irradiation in follow-up irradiation, the processor 110 decides an aspect in which ultraviolet light is uniformly cast on the entirety of the printed print image with the derived number of irradiation paths.

In step S135, by the function of the follow-up irradiation control unit 111*d*, the processor 110 instructs the printing device 200 to execute follow-up irradiation, based on the aspect of irradiation decided in step S130, via the communication unit 120.

Figure 6:
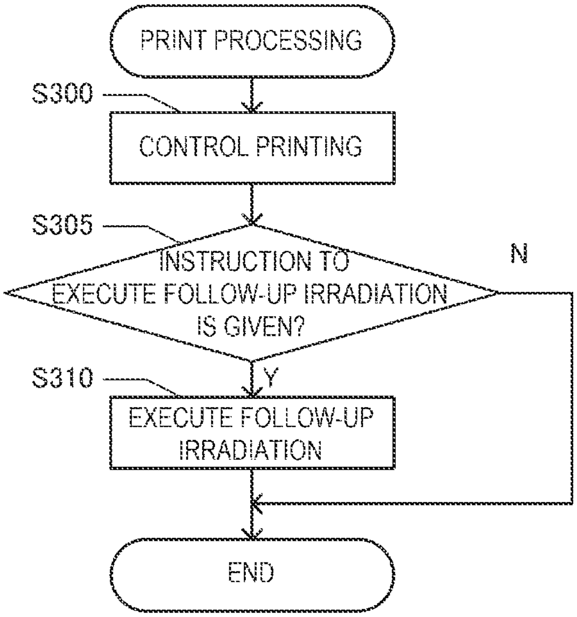
FIG. 6 is a flowchart showing an example of print execution processing.

Processing executed by the printing device 200 in response to an instruction from the information processing device 100 will now be described, referring to FIG. 6. As the processor 210 of the printing device 200 receives the instruction to print transmitted from the information processing device 100 in step S120, the processor 210 starts the processing shown in FIG. 6.

In step S300, by the function of the print execution unit 211*a*, the processor 210 executes the printing of the print image on the print medium via the print head 240, based on the print data received with the instruction to print from the information processing device 100. After completing the processing of step S300, the processor 210 advances the processing to step S305.

In step S305, by the function of the follow-up irradiation execution unit 211*b*, the processor 210 determines whether an instruction to execute follow-up irradiation is received from the information processing device 100 or not. When the processor 210 has determined that an instruction to execute follow-up irradiation is received from the information processing device 100, the processor 210 advances the processing to step S310. Meanwhile, when the processor 210 has determined that an instruction to execute follow-up irradiation is not received from the information processing device 100, the processor 210 completes the processing shown in FIG. 6.

In step S310, by the function of the follow-up irradiation execution unit 211*b*, the processor 210 executes follow-up irradiation on the print image printed on the print medium by the processing of step S300, based on the aspect of irradiation designated by the information processing device 100. In this embodiment, the processor 210 executes, as the follow-up irradiation, uniform ultraviolet irradiation on the entirety of the print image printed in the number of irradiation paths notified of from the information processing device 100.

(3) Other Embodiments

The foregoing embodiment is an example for carrying out the present disclosure. Various other embodiments can also be employed. For example, while the information processing device 100 and the printing device 200 are formed by different devices from each other in the foregoing embodiment, the two devices may be formed as the same device. For example, each function of the information processing device 100 may be installed in the printing device 200. The information processing device 100 may also be formed by a plurality of devices. The order of the processing steps in the flowchart shown in FIG. 4 may differ. For example, the order of the processing of steps S100 and S105 may be changed.

In the foregoing embodiment, the characteristic information 130*c* is information representing the unit curing energy for various paints. However, the characteristic information 130*c* may be any other information representing the curability by ultraviolet irradiation with respect to various paints. For example, the characteristic information 130*c* about the coloring materials may be information about the color and components of the various coloring materials. The ultraviolet absorbability of a coloring material (what proportion of the energy cast on the coloring material is absorbed by the coloring material) is decided by the color of the coloring material. Also, if a component contributing to the curing of the coloring material is known, the energy required for the curing is decided. Therefore, the processor 110 may find the unit curing energy for various coloring materials, based on the color and components of the coloring materials. The characteristic information 130*c* may also be rank information about the curability by predetermined ultraviolet irradiation with respect to various paints. In this case, for example, on the assumption that a correspondence between each rank and unit curing energy is established in advance, the processor 110 may acquire the unit curing energy corresponding to each rank represented by the characteristic information 130*c*, as the unit curing energy for the corresponding paint.

In the foregoing embodiment, the processor 110 acquires the image data 130*a*, the print condition 130*b*, and the characteristic information 130*c* from the storage medium 130 by the function of the acquisition unit 111*a*. However, the processor 110 may acquire at least a part of the image data 130*a*, the print condition 130*b*, and the characteristic information 130*c* by other methods. For example, the processor 110 may accept an input of these pieces of information from the user via the UI unit 140 and thus may acquire the information.

In the foregoing embodiment, the irradiation intensity of ultraviolet light by the irradiation unit 242 is constant. However, the irradiation intensity of ultraviolet light by the irradiation unit 242 may be adjustable. In this case, the processor 110 may decide the intensity of the irradiation unit 242 in follow-up irradiation, when deciding an aspect of irradiation in follow-up irradiation by the function of the follow-up irradiation control unit 111*d*. For example, when the number of irradiation paths in follow-up irradiation, that is, the irradiation time of ultraviolet light on the same area, is constant, the processor 110 may do as follows. That is, the processor 110 in step S130 derives the energy cast per unit area in one irradiation path, by calculating (value of energy variable×(unit area/area of selected area))/number of irradiation paths. The processor 110 may then decide the irradiation intensity of the irradiation unit 242 in such a way that the derived energy can be cast in a scan corresponding to one irradiation path. In this case, the processor 110 instructs the printing device 200 to execute follow-up irradiation with the decided irradiation intensity of the irradiation unit 242.

As the aspect of irradiation in follow-up irradiation, the processor 110 may decide both the irradiation intensity and the irradiation time of the irradiation unit 242.

In the foregoing embodiment, the processor 110 determines that follow-up irradiation is needed when the curing energy is higher than the energy that is cast, for the paint ejected in the k-th path in the selected area. The processor 110 may also store the position of the selected area where the curing energy is higher than the energy that is cast, for the paint ejected in the k-th path, as a position where the curing of the paint is insufficient. For example, the processor 110 in step S220 may also store the position in the print image of the selected area selected in the immediately preceding step S205, as a position where the curing the paint is insufficient, in the storage medium 130. In this case, for example, the processor 110 in step S130 may decide a partial area including the position where the curing of the paint is insufficient, stored in the storage medium 130, instead of the entirety of the printed print image, as an ultraviolet irradiation target area in follow-up irradiation. For example, the processor 110 may decide the area of the position where the curing of the paint is insufficient, as an ultraviolet irradiation target area in follow-up irradiation. Also, on the assumption that an area that can be scanned by one scan from one end to the other end in the main scanning direction of the print head 240 is defined as a scanned area, the processor 110 may decide a scanned area including the area of the position where the curing of the paint is insufficient, as an ultraviolet irradiation target area in follow-up irradiation. The processor 110 may then decide an aspect of irradiation to irradiate the decided target area with ultraviolet light, as the aspect of ultraviolet irradiation in follow-up irradiation. Thus, the processor 110 can reduce the cost of ultraviolet irradiation.

In the foregoing embodiment, the size of the selected area is the size of one pixel. However, the size of the selected area may be other sizes. For example, the size of the selected area may be an area having a predetermined width in the main scanning direction and having a width in the sub scanning direction that can be scanned in one scan by the print head 240 in the sub scanning direction. The size of the selected area may also be a size such as 10×10 pixels, 100×100 pixels, or the like.

The present disclosure can also be applied as a program executed by a computer and as a method. The system, the program, and the method as described above may be implemented as a single device or may be implemented using components of a plurality of devices and therefore include various aspects. For example, the system, the program, and the method can be changed according to need, such as being implemented partly by software and partly by hardware. Also, the present disclosure may be implemented as a recording medium storing a program for controlling an information processing device. Of course, the recording medium storing the program may be a magnetic recording medium or a semiconductor memory. Any recording medium to be developed in the future can be similarly employed.

What is claimed is:

1. An information processing device controlling a printing device, the printing device including an ejection unit ejecting a paint that is cured by ultraviolet light and an irradiation unit irradiating the paint ejected on a print medium with ultraviolet light, the information processing device comprising:

an acquisition unit acquiring characteristic information of the paint, a print condition in printing by the printing device, and image data representing an image printed by the printing device; and a determination unit determining whether execution of follow-up irradiation, which is additional ultraviolet irradiation performed after the printing of the image involving normal ultraviolet irradiation by the irradiation unit, is needed or not based on the characteristic information, the print condition, and the image data, wherein when it is determined that the execution of the follow-up irradiation is needed, the determination unit decides energy of ultraviolet light with which the image printed on the print medium is irradiated in the follow-up irradiation that is executed, based on the characteristic information, the print condition, and the image data.

2. The information processing device according to claim 1, wherein the ejection unit and the irradiation unit are provided in a print head, and in scanning by the print head, the ejection of the paint from the ejection unit and the irradiation by the irradiation unit are executed.

3. The information processing device according to claim 1, further comprising:

a follow-up irradiation control unit controlling the printing device to adjust at least one of an irradiation intensity and an irradiation time of the irradiation unit in the follow-up irradiation in order to implement irradiation of the image printed on the print medium with the energy.

4. The information processing device according to claim 3, wherein the follow-up irradiation control unit controls the printing device to adjust a number of times of scanning by a print head provided with the irradiation unit and thus adjust the irradiation time, in order to implement irradiation of the image printed on the print medium with the energy.

5. The information processing device according to claim 1, wherein the print condition includes at least one of a number of print paths in printing the image data and an image resolution in printing the image data.

6. The information processing device according to claim 5, wherein at least one of the number of print paths and the image resolution is decided by a designated value of image quality of the image formed on the print medium by the printing of the image data.

7. An information processing method executed by an information processing device controlling a printing device, the printing device including an ejection unit ejecting a paint that is cured by ultraviolet light and an irradiation unit irradiating the paint ejected on a print medium with ultraviolet light, the method comprising:

an acquisition step of acquiring characteristic information of the paint, a print condition in printing by the printing device, and image data representing an image printed by the printing device; and a determination step of determining whether execution of follow-up irradiation, which is additional ultraviolet irradiation performed after the printing of the image involving normal ultraviolet irradiation by the irradiation unit, is needed or not based on the characteristic information, the print condition, and the image data, wherein when it is determined that the execution of the follow-up irradiation is needed, the determination unit decides energy of ultraviolet light with which the image printed on the print medium is irradiated in the follow-up irradiation that is executed, based on the characteristic information, the print condition, and the image data.

8. A non-transitory computer-readable storage medium storing a program for a computer, the computer controlling a printing device, the printing device including an ejection unit ejecting a paint that is cured by ultraviolet light and an irradiation unit irradiating the paint ejected on a print medium with ultraviolet light, the program causing the computer to execute:

an acquisition step of acquiring characteristic information of the paint, a print condition in printing by the printing device, and image data representing an image printed by the printing device; and a determination step of determining whether execution of follow-up irradiation, which is additional ultraviolet irradiation performed after the printing of the image involving normal ultraviolet irradiation by the irradiation unit, is needed or not based on the characteristic information, the print condition, and the image data, wherein when it is determined that the execution of the follow-up irradiation is needed, the determination unit decides energy of ultraviolet light with which the image printed on the print medium is irradiated in the follow-up irradiation that is executed, based on the characteristic information, the print condition, and the image data.

* * * * *